(12) United States Patent
Ji et al.

(10) Patent No.: US 6,372,307 B1
(45) Date of Patent: Apr. 16, 2002

(54) CHIP CARD WITH A BISTABLE DISPLAY

(75) Inventors: Li Ji, Hagashijurume (JP); Rainer Wingen, Hattersheim (DE)

(73) Assignee: Aventis Research & Technologies GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/463,351

(22) PCT Filed: Jul. 21, 1998

(86) PCT No.: PCT/EP98/04545

§ 371 Date: May 30, 2000

§ 102(e) Date: May 30, 2000

(87) PCT Pub. No.: WO99/05236

PCT Pub. Date: Feb. 4, 1999

(30) Foreign Application Priority Data

Jul. 25, 1997 (DE) .......................................... 197 32 160

(51) Int. Cl.7 ......................... C09K 19/02; C09K 19/04; G06K 19/77; G09G 3/36
(52) U.S. Cl. .................... 428/1.1; 252/299.01; 235/380; 345/87; 345/98
(58) Field of Search ..................... 252/299.01; 428/1.1; 235/380; 345/87, 98

(56) References Cited

U.S. PATENT DOCUMENTS 5,630,962 A * 5/1997 Schlosser et al. ...... 252/299.61
5,776,363 A * 7/1998 Hornung et al. ....... 252/299.01
6,019,284 A * 2/2000 Freeman et al. ............ 235/380

FOREIGN PATENT DOCUMENTS

| EP | 0291259 | 11/1988 | |
|----|---------|---------|---|
| EP | 0844293 | 5/1998 | |
| JP | 2-208096 | * | 8/1990 |
| JP | 5-264950 | * | 10/1993 |
| JP | 5-264953 | * | 10/1993 |

OTHER PUBLICATIONS

Patent Abstract of JP 2–208096, 1990.*
Patent Abstract of JP 5–264950, 1993.*
Patent Abstract of JP 5–264953, 1993.*

* cited by examiner

*Primary Examiner*—Shean C. Wu
(74) *Attorney, Agent, or Firm*—Frommer Lawrence & Haug LLP

(57) ABSTRACT

The present invention relates to a chip card containing a ferroelectric liquid-crystal display containing a ferroelectric liquid-crystal display containing a ferroelectric liquid-crystal layer in which the liquid-crystal layer has optical anisotropy values of $\leq 0.15$ in the region of the operating temperature.

The chip card according to the invention is particularly practicable since the display can be switched at voltages $\leq 15$ V, generally $\leq 5$ V. It can be written in a broad temperature range, and is robust to everyday loads, such as pressure, flexing or thermal deformation.

7 Claims, No Drawings

CHIP CARD WITH A BISTABLE DISPLAY

RELATED APPLICATIONS

This application is filed under 35 U.S.C. 371 from International Application No. PCT/EP98/04545, filed on Jul. 21, 1998, claiming priority to German application No. 197 32 160.7, filed on Jul. 25, 1997.

BACKGROUND OF THE INVENTION

1. Field of the Invention

The term "chip card" is taken to mean a card, usually made of plastic and in credit card format, provided with an integrated circuit which is capable of storing and/or processing information electronically, and means for information transmission between the card and an electronic read and/or write system A smart card is a chip card which contains additional means for checking/controlling access to the card. For example, these means can be an integrated circuit which controls who uses the stored information and for what purpose. This enables data security to be increased.

Chip cards or smart cards are already in widespread use, for example as telephone cards, credit cards, "medicards", cash cards, and as identity cards for access control.

In the near future, it is expected that this technology will penetrate further into areas such as the "electronic wallet", i.e. replacement of cash, travel tickets and pay TV.

A desirable feature for chip cards, and one that has already been proposed, is a permanent, visible electronic display on the card which provides information, for example on the amount stored, the amount remaining and date information.

Such a display should be legible even without application of an electric voltage, since neither the thickness nor the production costs of a card allow the installation of a battery. The display must thus be capable of optical storage.

2. Description of the Related Art

For reasons of optical bistability, surface-stabilized ferroelectric liquid-crystal Displays (SSFLCDs) and bistable nematic displays (see E. Lüder et al., 1997 International Symposium, Seminar & Exhibition, Society of Information Display, Boston, Mass., Abstract 9.4, SID 97 DIGEST, pp. 109–112) and surface- and polymer-stabilized cholesteric textures (SSCT or PSCT) have been proposed for such applications.

SSFLCDs are already being used in computer displays, but use in chip cards requires a significantly different property profile, covering, for example in accordance with ISO 7816, compressive strength, impact resistance, flexibility, a low addressing voltage of preferably $\leq 5$ volts, legibility in daylight and in particular low thickness and weight in addition to optical storage capability.

There is therefore a high demand for SSFLCD displays or ferroelectric liquid-crystal mixtures (FLCs) for such displays which, in particular, are up to the demands made of chip cards or smart cards.

Surprisingly, it has now been found that ferroelectric liquid-crystal mixtures having low optical anisotropy (An) values are particularly suitable for use in ferroelectric liquid-crystal (FLC) displays for chip cards.

SUMMARY OF THE INVENTION

The invention therefore relates to a chip card containing a ferroelectric liquid-crystal display containing ferroelectric liquid-crystal layer, wherein the liquid-crystal layer has optical anisotropy values of $\leq 0.15$ in the region of the operating temperature.

DETAILED DESCRIPTION OF THE INVENTION

The chip card according to the invention is particularly practicable since the display can be switched at voltages $\leq 15$ V, generally $\leq 5$ V. It can be written in a broad temperature range and is robust to everyday loads, such as pressure, flexing or thermal deformation.

The display used according to the invention has a high switching angle, a low switching voltage and low temperature dependence. Defect lines can be suppressed. No zig-zag deformations occur, or if they do, they are of such low magnitude that they are unimportant.

The chip card according to the invention is preferably a smart card.

The optical anisotropy is preferably from 0.05 to 0.15, particularly preferably from 0.08 to 0.14, very particularly preferably from 0.10 to 0.14, especially from 0.11 to 0.14, in the temperature region of the operating temperature of the liquid-crystal display. The region of the operating temperature is defined by the operating temperatures of the read/write equipment and is thus generally between −10 and 40° C.

The tilted smectic, optically active (ferroelectric) liquid crystal (FLC) preferably consists of a mixture of low-molecular-weight compounds of the formula (I) given below and possibly further mixture components. The working phase is a chiral tilted phase, preferably the $S_c^*$ phase. The mixtures preferably comprise a non-optically active base mixture, preferably in a proportion of >50%, and one or more optically active compounds (dopants), which may themselves be liquid-crystalline, but need not be liquid-crystalline.

The spontaneous polymerization of the mixture is generally in the range from 0.1 to 100 nCcm$^{-2}$, preferably from 3 to 60 nCcm$^{-2}$, particularly preferably from 5 to 40 nCcm$^{-2}$.

Compounds which are suitable for the preparation of a chip-card display mixture according to the invention can be described, for example, by the general formula (I)

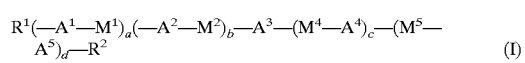

(I)

where the symbols and indices are defined as follows:

$R^1$ is a) hydrogen, —F, —Cl, —CF$_3$, —OCF$_3$ or —CN, b) a straight-chain or branched alkyl radical (with or without an asymmetrical carbon atom) having 1 to 20 carbon atoms, where 1) one or more non-adjacent and non-terminal —CH$_2$— groups may be replaced by —O—, —S—, —CO—, —CO—O—, —O—CO—, —O—CO—O— or —Si(CH$_3$)$_2$—, and/or 2) one or more —CH$_2$—groups may be replaced by —CH=CH—, —C≡C—, cyclopropane-1,2-diyl, 1,4-phenylene, 1,4-cyclo-hexylene or 1,3-cyclopentylene, and/or 3) one or more H atoms may be replaced by F, CN and/or Cl, and/or 4) the terminal —CH$_3$ group may be replaced by one of the following chiral groups (optically active or racemic):

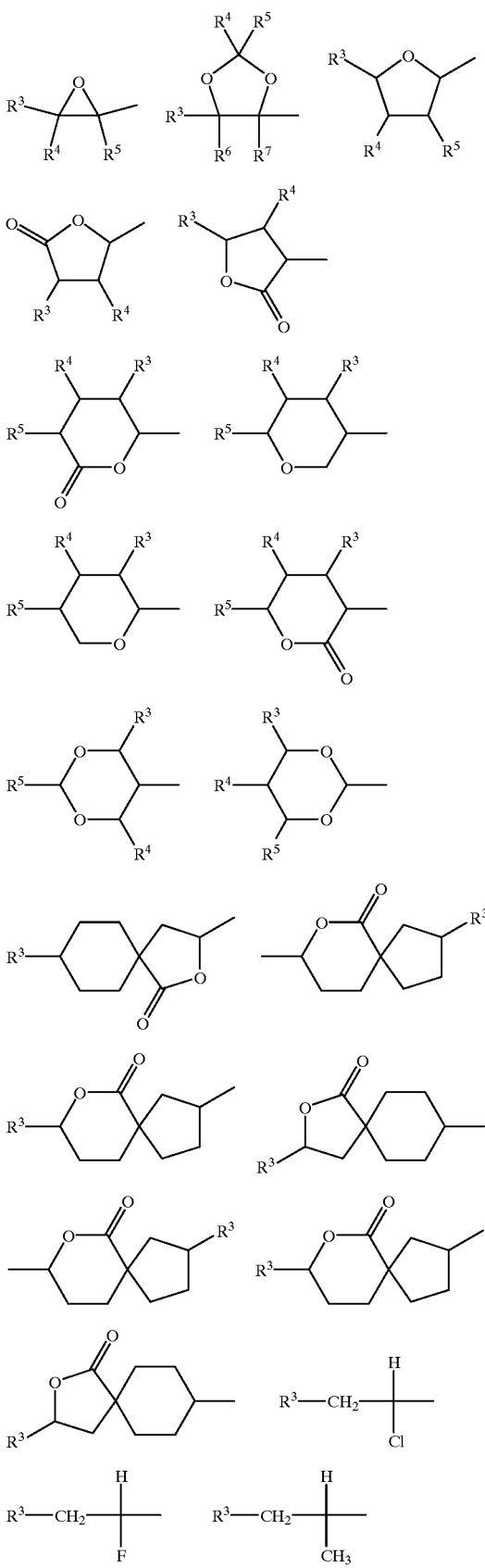

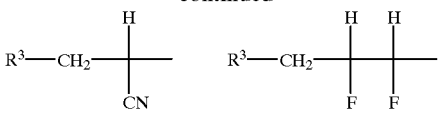

R³, R⁴, R⁵, R⁶ and R⁷ are identical or different and are
a) hydrogen
b) a straight-chain or branched alkyl radical (with or without an asymmetrical carbon atom) having 1 to 16 carbon atoms, where
   b1) one or more non-adjacent and non-terminal —CH₂— groups may be replaced by —O—, and/or
   2) one or two —CH₂— groups may be replaced by —CH=CH—,
c) R⁴ and R⁵ together may alternatively be —(CH₂)₄— or —(CH₂)₅— if they are bonded to an oxirane, dioxolane, tetrahydrofuran, tetrahydropyran, butyrolactone or valerolactone system;

R² is a straight-chain or branched alkyl radical (with or without an asymmetrical carbon atom) having 1 to 20 carbon atoms, where
   a) one or more non-adjacent and non-terminal —CH₂— groups may be replaced by —O—, —S—, —CO—, —CO—O—, —O—CO—, —O—CO—O— or —Si(CH₃)₂—, and/or
   b) one or more —CH₂— groups may be replaced by —CH=CH—, —C≡C—, cyclopropane-1,2-diyl, 1,4-phenylene, 1,4-cyclohexylene or 1,3-cyclopentylene;

M¹, M², M⁴ and M⁵ are identical or different and are a single bond or —CO—O—, —CO—S—, —CS—O—, —CS—S—, —CH₂—O—, —CH₂—S—, —CH₂—CH₂—, —CH=CH—, —C≡C—, —CH₂—CH₂—CO—O—, —CH₂CH₂CH₂O—, —CH₂CH₂CH₂CH₂—, (E)—CH=CHCH₂O—, and their mirror-image arrangements; or a single bond, A¹ and A⁵ are identical or different and are cyclohexane-1,4-diyl, 1-cyanocyclohexane-1,4-diyl, 1,3-dioxane-2,5-diyl, 5-cyano-1,3-dioxane-2,5-diyl, 1,3-dioxaborinane-2,5-diyl or 1-alkyl-1-silacyclohexane-1,4-diyl;

A² and A⁴ are identical or different and are cyclohexane-1,4-diyl, 1-cyanocyclohexane-1,4-diyl, 1,3-dioxane-2,5-diyl, 5-cyano-1,3-dioxane-2,5-diyl, 1,3-dioxaborinane-2,5-diyl or 1-alkyl-1-silacyclohexane-1,4-diyl, 1,4-phenylene, 2-fluoro-1,4-phenylene, 2,3-difluoro-1,4-phenylene, pyrimidine-2,5-diyl, pyridine-2,5-diyl or 2-fluoropyridine-3,6-diyl;

A³ is 1,4-phenylene, in which one or more H atoms may be replaced by F, Cl, CH₃, C₂H₅, OCH₃, CF₃, OCF₃ and/or CN, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,3,4-thiadiazole-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4-diyl, in which one H atom may be replaced by F, Cl and/or CN, thiophene-2,5-diyl, in which one or two H atoms may be replaced by F, Cl and/or CN, naphthalene-2,6-diyl, naphthalene-1,4-diyl or naphthalene-1,5-diyl, in each of which one or more H atoms may be replaced by F, Cl and/or CN and/or one or two CH groups may be replaced by N;

a, b, c and d are zero or one and the sum a+d is 1 or 2, with the proviso that the compound of the formula (I) cannot contain more than four five- or multimembered ring systems.

The symbols and indices in the formula (I) are preferably defined as follows:

$R^1$ is preferably a) hydrogen, —F, —OCF$_3$ or —CN, b) a straight-chain or branched alkyl radical (with or without an asymmetrical carbon atom) having 1 to 18 carbon atoms, where b1) one or more non-adjacent and non-terminal —CH$_2$— groups may be replaced by —O—, —CO—O—, —O—CO—, —O—CO—O— or —Si(CH$_3$)$_2$—, and/or 2) one —CH$_2$— group may be replaced by cyclopropane-1,2-diyl, 1,4-phenylene or trans-1,4-cyclohexylene, and/or 3) one or more H atoms may be replaced by F, $R^1$ is particularly preferably a) hydrogen, b) a straight-chain or branched alkyl radical (with or without an asymmetrical carbon atom) having 1 to 16 carbon atoms, where one or two non-adjacent and non-terminal —CH$_2$— groups may be replaced by —O—, —CO—O—, —O—CO—, —O—CO—O— or —Si(CH$_3$)$_2$—, $R^3$, $R^4$, $R^5$, $R^6$ and $R^7$ are preferably identical or different and are preferably a) hydrogen b) a straight-chain or branched alkyl radical (with or without an asymmetrical carbon atom) having 1 to 14 carbon atoms, where b1) one or two non-adjacent and non-terminal —CH$_2$— groups may be replaced by —O—, and/or 2) one —CH$_2$— group may be replaced by —CH=CH—, c) $R^4$ and $R^5$ together may alternatively be —(CH$_2$)$_4$— or —(CH$_2$)$_5$— if they are bonded to an oxirane, dioxolane, tetrahydrofuran, tetrahydropyran, butyrolactone or valerolactone system.

$R^3$, $R^4$, $R^5$, $R^6$ and $R^7$ are particularly preferably identical or different and are particularly preferably a) hydrogen b) a straight-chain or branched alkyl radical (with or without an asymmetrical carbon atom) having 1 to 14 carbon atoms, where 1) one non-terminal —CH$_2$— group may be replaced by —O—, c) $R^4$ and $R_5$ together may alternatively be —(CH$_2$)$_4$— or —(CH$_2$)$_5$— if they are bonded to an oxirane, dioxolane, tetrahydrofuran, tetrahydropyran, butyrolactone or valerolactone system.

$R^2$ is preferably a straight-chain or branched alkyl radical (with or without an asymmetrical carbon atom) having 1 to 18 carbon atoms, where one or more non-adjacent and non-terminal —CH$_2$— groups may be replaced by —O—, —CO—O—, —O—CO—, —O—CO—O— or —Si(CH$_3$)$_2$— and/or one —CH$_2$— group may be replaced by cyclopropane-1,2-diyl, 1,4-phenylene or trans-1,4-cyclohexylene and/or one or more H atoms may be replaced by F.

$R^2$ is particularly preferably a) a straight-chain alkyl radical having 4 to 16 carbon atoms, where one or two non-adjacent and non-terminal —CH$_2$— groups may be replaced by —O— and/or —Si(CH$_3$)2— b) a branched alkyl radical having 4 to 16 carbon atoms, where one or two non-adjacent and non-terminal —CH$_2$— groups may be replaced by —O—.

$M^1$, $M^2$, $M^4$, $M^5$ are preferably identical or different and are preferably —CO—O—, —CH$_2$—O—, —C≡C—, —CH$_2$—CH$_2$—CO—O—, —CH$_2$—CH$_2$— and a mirror-image arrangement thereof or a single bond.

$M^1$, $M^2$, $M^4$, $M^5$ are particularly preferably identical or different and are particularly preferably —CO—O—, —CH$_2$—O—, and a mirror-image arrangement thereof or a single bond.

$A^1$, $A^2$, $A_4$ and $A^5$ are preferably identical or different and are preferably cyclohexane-1,4-diyl, 1,3-dioxane-2,5-diyl, 1,3-dioxaborinane-2,5-diyl or 1-alkyl-1-silacyclohexane-1,4-diyl.

$A^1$, $A^2$, $A^4$ and $A^5$ are particularly preferably identical or different and are particularly preferably cyclohexane-1,4-diyl or 1,3-dioxane-2,5-diyl.

$A^3$ is preferably 1,4-phenylene, in which one or 2 H atoms may be replaced by F, Cl, CN or CH$_3$, pyrimidine-2,5-diyl, pyridine-2,5-diyl, in which 1 H atom may be replaced by F, or 1,3,4-thiadiazole-2,5-diyl.

$A^3$ is particularly preferably 1,4-phenylene, 2,3-difluoro-1,4-phenylene, 2-methyl-1,4-phenylene or 2-fluoropyridine-3,6-diyl.

Preferred compounds are those of the formulae (I-A1) to (I-A7):

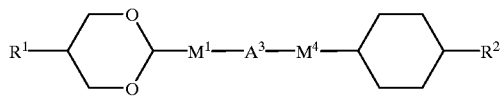

(I-A1)

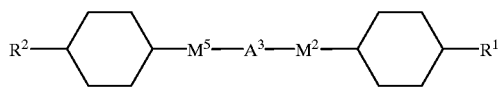

(I-A2)

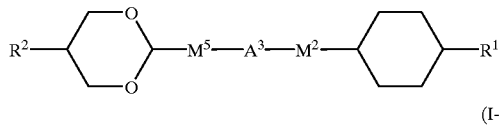

(I-A3)

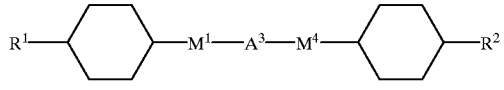

(I-A4)

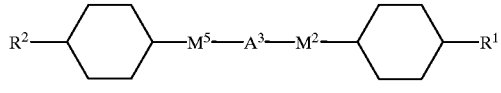

(I-A5)

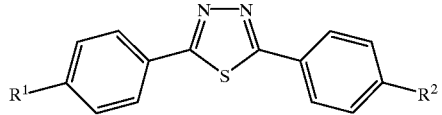

(I-A6)

(I-A7)

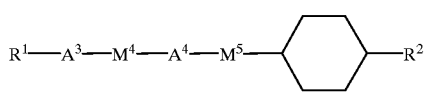

(I-A7)

Particularly preferred compounds are those of the formulae (I-B1) to (I-B14):

(I-B1)

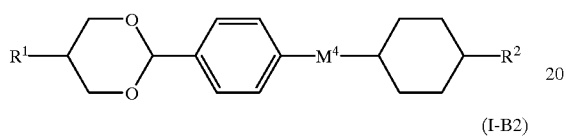

(I-B2)

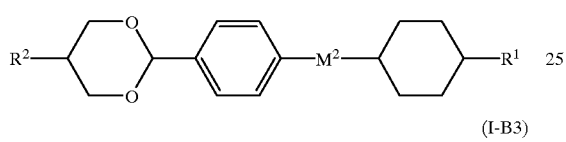

(I-B3)

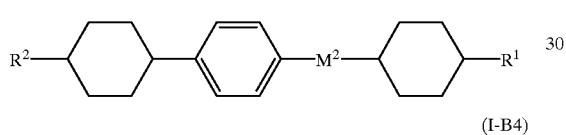

(I-B4)

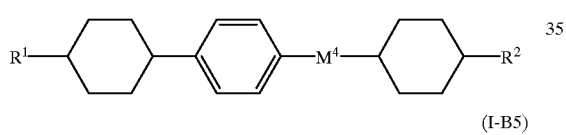

(I-B5)

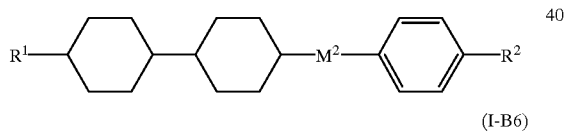

(I-B6)

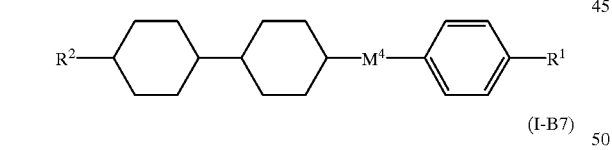

(I-B7)

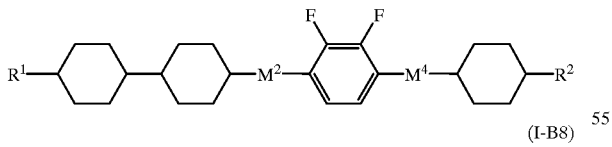

(I-B8)

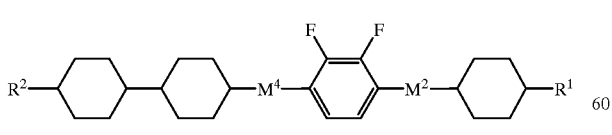

(I-B9)

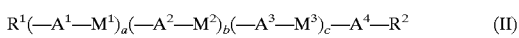

(I-B10)

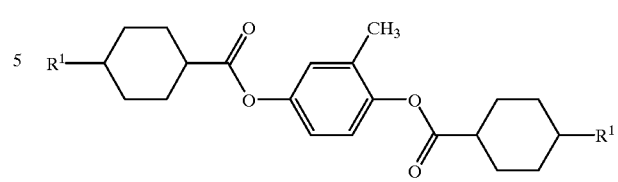

(I-B11)

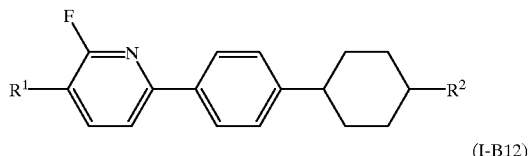

(I-B12)

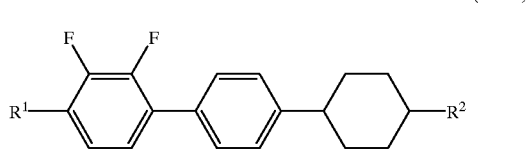

(I-B13)

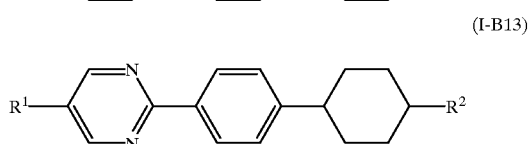

(I-B14)

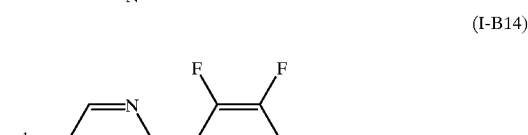

The FLC mixtures used according to the invention consist of at least 2, preferably from 3 to 30, particularly preferably from 4 to 20 components.

The mixtures generally comprise from 20 to 85% by weight, preferably from 30 to 85% by weight, particularly preferably from 40 to 85% by weight, of one or more compounds of the formula (I).

The components of the liquid-crystal mixture are preferably selected from the compounds of the formula (I) mentioned above. In addition, known smectogenic and/or nematogenic compounds, preferably those having thermodynamically stable smectic and/or nematic and/or cholesteric phases, for example of the formula (II), may be present in the mixture, $$R^1(-A^1-M^1)_a(-A^2-M^2)_b(-A^3-M^3)_c-A^4-R^2 \qquad (II)$$

in which a, b and c are identical or different and are, independently of one another as defined in the formula (I), $R^1$ and $R^2$ are identical or different and are, independently of one another, as defined in the formula (I), with the proviso that at most one of the radicals $R^1$ and $R^2$ is hydrogen, —F, —Cl, —CF$_3$, —OCF$_3$ or —CN, and $M^1$, $M^2$ and $M^3$ are identical or different and are, independently of one another, as defined for $M^1$, $M^2$, $M^4$ and $M^5$ in the formula (I).

$A^1$, $A^2$, $A^3$ and $A^4$ are identical or different and are, independently of one another, 1,4-phenylene, in which one or more H atoms may be replaced by F, Cl, CH$_3$, C$_2$H$_5$, OCH₃, CF₃, OCF3 and/or CN, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,3,4-thiadiazole-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4-diyl, in which one H atom may be replaced by F, Cl and/or CN, thiophene-2,5-diyl, in which one or two H atoms may be replaced by F, Cl and/or CN, naphthalene-2,6-diyl, naphthalene-1,4-diyl or naphthalene-1,5-diyl, in each of which one or more H atoms may be replaced by F, Cl and/or CN, and/or one or two CH groups may be replaced by N.

These include, for example:

derivatives of phenylpyrimidine, as described, for example, in WO 86/06401 and U.S. Pat. No. 4,874,542, meta-substituted six-membered-ring aromatic compounds, as described, for example, in EP-A 0 578 054, silicon compounds, as described, for example, in EP-A 0 355 008, mesogenic compounds having only one side chain, as described, for example, in EP-A 0 541 081, hydroquinonone derivatives, as described, for example, in EP-A 0 603 786, phenylbenzoates and biphenylbenzoates, as described, for example, in P. Keller, Ferroelectrics 1984, 58, 3; Liq. Cryst. 1987, 2, 63; Liq. Cryst. 1989, 5, 153; and J. W. Goodby et al., Liquid Crystals and Ordered Fluids, Vol. 4, New York, 1984, thiadiazoles, as described, for example, in EP-A 0 309 514, biphenyls, as described, for example, in EP-A 0 207 712 or Adv. Liq. Cryst. Res. Appi. (Ed. Bata, L.) 3 (1980), phenylpyridines, as described, for example, in Ferroelectrics 1996, 180, 269, or Liq. Cryst. 1993, 14, 1169, benzanilides, as described, for example, in Liq. Cryst. 1987, 2, 757, or Ferroelectrics 1984, 58, 81, terphenyls, as described, for example, in Mol. Cryst. Liq. Cryst. 1991, 195, 221; WO-A 89/02425 or Ferroelectrics 1991, 114, 207, 4-cyanocyclohexyls, as described, for example, in Freiburg Congress on Liquid Crystals 1986, 16, V8, 5-alkylthiophenecarboxylic esters, as described, for example, in Butcher, J. L., dissertation, Nottingham 1991, and 1,2-diphenylethanes, as described, for example, in Liq. Cryst. 1991, 9, 253.

Examples of chiral, non-racemic dopants are the following:

optically active phenylbenzoates, as described, for example, in P. Keller, Ferroelectrics 1984, 58, 3, and J. W. Goodby et al., Liquid Crystals and Ordered Fluids, Vol. 4, New York, 1984, optically active oxirane ethers, as described, for example, in EP-A 0 263 437 and WO-A 93/13093, optically active oxirane esters, as described, for example, in EP-A 0 292 954, optically active dioxolane ethers, as described, for example, in EP-A 0 351 746, optically active dioxolane esters, as described, for example, in EP-A 0 361 272, optically active tetrahydrofuran-2-carboxylic esters, as described, for example, in EP-A 0 355 561, optically active 2-fluoroalkyl ethers, as described, for example, in EP-A 0 237 007 and U.S. Pat. No. 5,051,506, and optically active α-halocarboxylic esters, as described, for example, in U.S. Pat. No. 4,855,429.

Other particularly preferred mixing components of the formula (II) are those in Groups A to K:

A. Phenylpyrimidine derivatives of the formula (III)

$$R^1—A^1—A^2—R^2 \quad (III)$$

in which

R¹ and R² are each alkyl having 1–15 carbon atoms, in which, in addition, one or two non-adjacent —CH₂— groups may be replaced by —O—, —S—, —CO—, —O—CO—, —CO—O—, —O—CO—O—, —CO—S—, —S—CO—, —CHHalogen—, —CHCN—and/or —CH=CH—, and in which one, more than one or all of the H atoms may be replaced by F, A¹ is 1,4-phenylene, or a single bond, and A² is

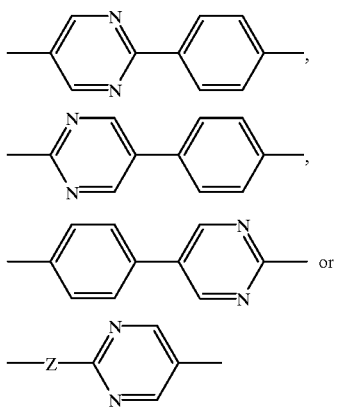

where

Z is —O—CO—, —CO—O—, —S—CO—, —CO—S—, —CH₂O—, —OCH₂— or —CH₂CH₂—.

B. Compounds having only one side chain, of the formula (IV)

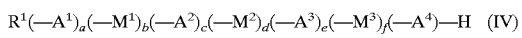
$$R^1(—A^1)_a(—M^1)_b(—A^2)_c(—M^2)_d(—A^3)_e(—M^3)_f(—A^4)—H \quad (IV)$$

in which:

R¹ is a straight-chain or branched alkyl radical having 1 to 22 or 3 to 22 carbon atoms respectively, in which one or two non-adjacent and non-terminal —CH₂— groups may also be replaced by —O—, —CO—, —CO—O—, —O—CO—, —O—CO—O— or —Si(CH₃)₂—, A¹, A², A³ and A⁴ are identical or different and are 1,4-phenylene, in which one or two H atoms may be replaced by F or CN, pyridine-2,5-diyl, in which one or two H atoms may be replaced by F, pyrimidine-2,5-diyl, in which one or two H atoms may be replaced by F, 1,3,4-thiadiazole-2,5-diyl or naphthalene-2,6-diyl, M¹, M² and M³ are identical or different and are

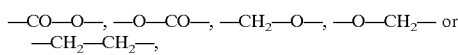
—CO—O—, —O—CO—, —CH₂—O—, —O—CH₂— or —CH₂—CH₂—, a, b, c, d, e and f are zero or one,
with the proviso that the sum a+c+e is 0, 1, 2 or 3.

C. Silicon compounds of the formula (V)

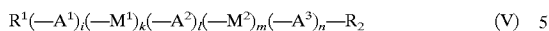
$$R^1(\text{—}A^1)_i(\text{—}M^1)_k(\text{—}A^2)_l(\text{—}M^2)_m(\text{—}A^3)_n\text{—}R_2 \qquad (V)$$

in which
- $R^1$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO— or —O—CO—O—,
- $R^2$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO— or —O—CO—O—, with the proviso that one CH$_2$ group not bonded to oxygen is replaced by —Si(CH$_3$)$_2$—,
- $A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, or 1,3,4-thiadiazole-2,5-diyl,
- $M^1$ and $M^2$ are identical or different and are —CO—O—, —O—CO—, —CH$_2$—O— or —O—CH$_2$—,
- i, k, l, m and n are zero or 1, with the proviso that i+l+n=2 or 3.

D. Hydroquinone derivatives of the formula (VI)

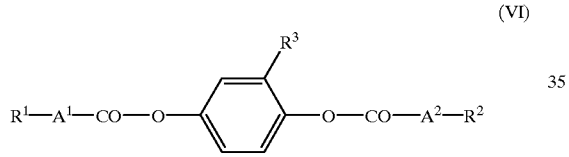

in which
- $R^1$ and $R^2$ are identical or different and are a straight-chain or branched alkyl radical having 1 or 3 to 16 carbon atoms, preferably 1 or 3 to 10 carbon atoms respectively, in which, in addition, one or two non-adjacent and non-terminal —CH$_2$— groups may be replaced by —O—, —CO—, —O—CO—, —CO—O— or —O—CO—O—, preferably —O—, —O—CO— or —CO—O—,
- $R^3$ is —CH$_3$, —CF$_3$ or —C$_2$H$_5$, preferably —CH$_3$ or —CF$_3$,
- $A^1$ and $A^2$ are identical or different and are 1,4-phenylene.

E. Pyridylpyrimidines of the formula (VII)

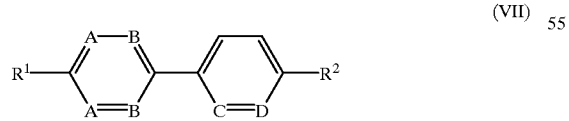

in which
- A is N and B is CH or A is CH and B is N, C is N and D is CH or C is CH and D is N, where one or two CH groups may be replaced by CF groups,
- $R^1$ and $R^2$ are identical or different and are a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO— or —O—CO—O—.

F. Phenylbenzoates of the formula (VIII)

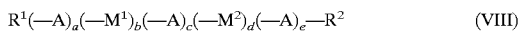
$$R^1(\text{—}A)_a(\text{—}M^1)_b(\text{—}A)_c(\text{—}M^2)_d(\text{—}A)_e\text{—}R^2 \qquad (VIII)$$

in which
- $R^1$ and $R^2$ are identical or different and are a straight-chain alkyl radical having 1 to 22 or 3 to 22 carbon atoms, in which, in addition, one or two non-adjacent and non-terminal —CH$_2$— groups may be replaced by —O—, —CO—, —CO—O—, —O—CO—or —O—CO—O—,
- A is 1,4-phenylene,
- $M^1$ and $M^2$ are identical or different and are —CO—O— or —O—CO—,
- a, b, c, d and e are zero or one, with the proviso that a+c+e=2 or 3 and b+d=1 or 2.

G. Optically active phenylbenzoates of the formula (IX)

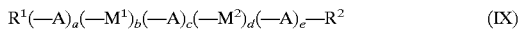
$$R^1(\text{—}A)_a(\text{—}M^1)_b(\text{—}A)_c(\text{—}M^2)_d(\text{—}A)_e\text{—}R^2 \qquad (IX)$$

in which
- $R^1$ and $R_2$ are identical or different and are a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO— or —O—CO—O—, and in which at least one of the radicals $R^1$ and $R^2$ is a branched, optically active alkyl group,
- A is 1,4-phenylene, in which one or two H atoms may be replaced by F,
- $M^1$ and $M^2$ are identical or different and are —CO—O—, —O—CO— or a single bond, and
- a, b, c, d and e are zero or one, with the proviso that a+c+e=2 or 3 and b+d=1 or2.

H. Optically active oxirane ethers of the formula (X)

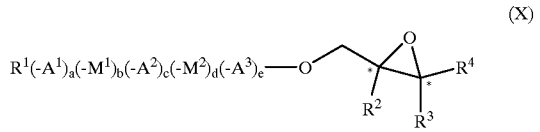

in which the symbols and indices are defined as follows:
- * is a center of chirality,
- $R^1$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO—, —O—CO—O—or —Si(CH$_3$)$_2$—, or the following optically active group,

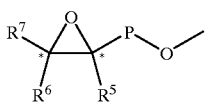

- $R_2$, $R^3$, $R^4$, $R^5$, $R_6$ and $R^7$ are identical or different and are hydrogen or a straight-chain or branched alkyl radical having 1 to 16 carbon atoms,
- P is —CH$_2$— or —CO—,
- $A^1$, $A^2$ and $A^3$ are identical or different and are 1,4-phenylene, in which one or two H atoms may be replaced by F, pyridine-2,5-diyl, in which one or two H atoms may each be replaced by F, pyrimidine-2,5-diyl, in which one or two H atoms may be replaced by F, or 1,3,4-thiadiazole-2,5-diyl, $M^1$ and $M^2$ are identical or different and are —CO—O—, —O—CO—, —CH$_2$—O—, —O—CH$_2$— or —CH$_2$—CH$_2$—, and a, b, c, d and e are zero or one.

The asymmetrical carbon atoms in the oxirane ring or rings can have identical or different R or S configurations.

I. Optically active oxirane esters of the formula (XI)

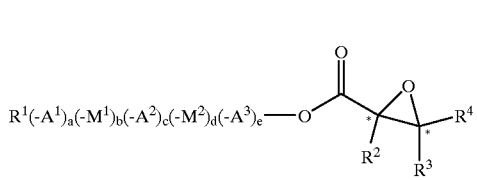

(XI)

in which the symbols and indices are defined as follows:
* is a center of chirality,
$R^1$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO—, —O—CO—O— or —Si(CH$_3$)$_2$—,
$R^2$, $R^3$ and $R^4$ are identical or different and are hydrogen or a straight-chain or branched alkyl radical having 1 to 16 carbon atoms,
$A^1$, $A^2$ and $A^3$ are identical or different and are 1,4-phenylene, in which one or two H atoms may be replaced by F, pyridine-2,5-diyl, in which one or two H atoms may each be replaced by F, pyrimidine-2,5-diyl, in which one or two H atoms may be replaced by F, or 1,3,4-thiadiazole-2,5-diyl,
$M^1$ and $M^2$ are identical or different and are —CO—O—, —O—CO—, —CH$_2$—O—, —O—CH$_2$— or —CH$_2$—CH$_2$—, and
a, b, c, d and e are zero or one.

The asymmetrical carbon atoms in the oxirane ring can have identical or different R or S configurations.

J. Optically active dioxolane ethers of the formula (XII)

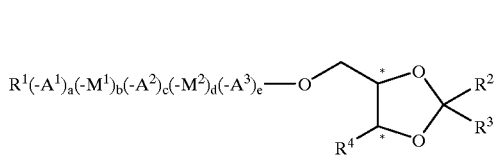

(XII)

in which the symbols and indices are defined as follows:
* is a center of chirality,
$R^1$ is a straight-chain or branched alkyl radical having 1 to 22 or 3 to 22 carbon atoms respectively, in which, in addition, one or two non-adjacent and non-terminal —CH$_2$— groups may be replaced by —O—, —C—, —CO—O—, —O—CO—, —O—CO—O— or —Si(CH$_3$)$_2$—,
$R^2$, $R^3$ and $R^4$ are identical or different and are hydrogen, a straight-chain or branched alkyl radical having 1 to 16 or 3 to 10 carbon atoms respectively or an alkenyl radical having 2 to 16 carbon atoms, where $R^2$ and $R^3$ together may alternatively be —(CH$_2$)$_5$—, $A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, or 1,3,4-thiadiazole-2,5-diyl, $M^1$ and $M^1$ are identical or different and are —CO—O—, —O—CO—, —CH$_2$—O—, —O—CH$_2$— or —CH$_2$—CH$_2$—, and a, b, c, d and e are zero or one.

Asymmetrical carbon atoms in the dioxolane ring can have identical or different R or S configurations.

K. Optically active dioxolane esters of the formula (XIII)

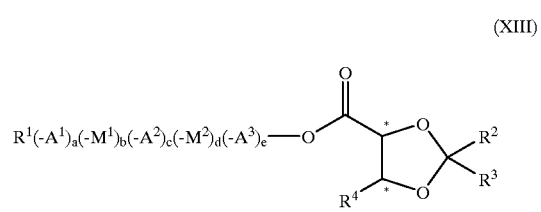

(XIII)

in which the symbols and indices are defined as follows:
* is a center of chirality,
$R^1$ is a straight-chain or branched alkyl radical having 1 to 16 or 3 to 16 carbon atoms respectively, in which, in addition, one or two non-adjacent and non-terminal —CH$_2$— groups may be replaced by —O—, —CO—, —O—CO— or —CO—O—,
$R^2$, $R^3$ and $R^4$ are identical or different and are hydrogen or an alkyl or alkenyl radical having 1 to 10 or 2 to 10 carbon atoms respectively, where $R^2$ and $R^3$ together may alternatively be —(CH$_2$)$_5$—,
$A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, or 1,3,4-thiadiazole-2,5-diyl,
$M^1$ and $M^2$ are identical or different and are —CO—O—, —O—CO—, —CH$_2$—O—, —O—CH$_2$— or —CH$_2$—CH$_2$—, and
a, b, c, d and e are zero or one.

Asymmetrical carbon atoms in the dioxolane ring can have identical or different R or S configurations.

L. 1,3,4-Thiadiazoles of the formula (XIV)

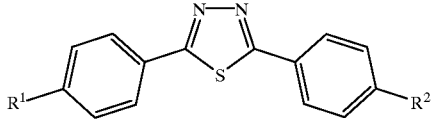

in which $R^1$ and $R^2$ are identical or different and are a straight-chain or branched alkyl group having 4 to 16 carbon atoms, in which, in addition, one non-terminal —CH$_2$— group may be replaced by —O—, —C(=O), —C(=O)O— or —Si(CH$_3$)2—, and/or one or more H atoms may be replaced by F.

In addition to components of the formulae (I) and (II) the FLC mixtures may preferably also contain meta-substituted compounds of the formula (XV)

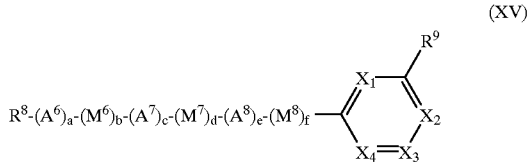

in which
- $R^8$ and $R^9$ are identical or different and are a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO—, —O—CO—O— or —$Si(CH_3)_2$—,
- $A^6$, $A^7$ and $A^8$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —$CH_3$, or 1,3,4-thiadiazole-2,5-diyl, and $A^6$ is alternatively

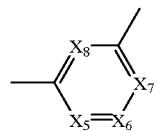

- $M^6$, $M^7$ and $M^8$ are identical or different and are —O—, —C O—O—, —O—C O—, —$CH_2$—O—, —O—$CH_2$— or —$CH_2$—$CH_2$—,
- $X^1$, $X^2$, $X^3$, $X^4$, $X^5$, $X^6$, $X^7$ and $X^8$ are CH or N, the number of N atoms per six-membered ring being 0, 1 or 2,
- a, b, c, d, e and f are zero or one, with the proviso that the sum a+c+e is 0, 1, 2 or 3 and/or macrocyclic compounds of the formula (XVI)

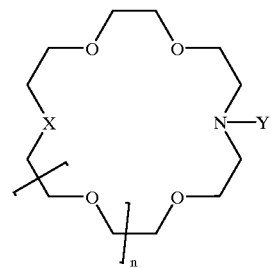

in which
- n is 0 or 1,
- Y is —CO-(t-butyl), —CO-(adamantyl) or —CO-alkyl, and
- X is —O— or —N(Y)—.

The components of the formulae (I) to (XVI) are prepared by methods known per se which are familiar to the person skilled in the art, as described, for example, in Houben-Weyl, Methoden der organischen Chemie [Methods of Organic Chemistry], Georg Thieme Verlag, Stuttgart, or the publications cited therein.

The mixture is prepared by known methods.

Preference is given to mixtures comprising from 20 to 85% by weight, preferably from 40 to 85% by weight, of one or more compounds of the formula (I), preferably of the formulae (IA1) to (IB14), and from 80 to 15% by weight, preferably from 60 to 15% by weight, of one or more compounds of the formulae (II), (XIV) and/or (XV).

Preference is likewise given to mixtures comprising 4 or more components of the formula (I), particularly preferably 4 or more components of the formula (I) and 2 or more components of the formula (II).

Preference is furthermore given to mixtures comprising
- one or more components of the formula (I) in which $A^1$, $A^2$, $A^3$ and $A^4$ are cyclohexane-1,4-diyl or 2,3-dioxane-2,5-diyl, and/or
- one or more components of the formula (I) in which $R^1$ is a straight-chain alkyl group having 4 to 16 carbon atoms, in which, in addition, one non-terminal —$CH_2$— group may be replaced by —O— and in which a further, non-adjacent (non-terminal) —$CH_2$— group is replaced by —$Si(CH_3)_2$—, and/or
- one or more components of the formula (I) in which $R^1$ is a branched alkyl group having 4 to 16 carbon atoms, in which, in addition, one non-terminal —$CH_2$— group may be replaced by —O—, and/or
- from one to five components of the formula (I) in which $R^1$ is H.

The ferroelectric liquid-crystal (FLC) display used according to the invention contains two outer plates, which can be made of glass or, for flexibility, preferably of plastic or one of glass and one of plastic. Suitable plastics are, for example, known plastics, such as polyacrylates, polyether sulfone, cycloolefin polymers, polyether imides, polycarbonate, polystyrene, polyester, polymethyl methacrylate, and copolymers or blends thereof. The insides of these outer plates are provided with conductive transparent layers, and alignment layers and possibly further auxiliary layers, such as insulation layers.

The alignment layer(s) are usually rubbed films of organic polymers or obliquely vapor-deposited silicon oxide.

Of crucial importance for the electro-optical properties and storage properties of the display is the approximately 1–3 μm thick FLC layer, whose layer thickness is preferably fixed by spacers. These spacers can be incorporated particles, such as beads, or structured columns in the interior of the display.

The entire cell, which is usually sealed by means of an adhesive frame, can be provided with electrical contacts, for example by soldering, bonding, pressing or the like. The display is addressed with a voltage or voltage pulses through a suitable electronic circuit. The addressing is generally effected directly or as multiplex addressing (see, for example, Jean Dijon in Liquid Crystals, Application and Uses (Ed. B. Bahadur), Vol. 1, 1990, Chapter 13, pp. 305–360) or T. Harada, M. Taguchi, K. Iwasa, M. Kai, SID 85 Digest, 131 (1985).

The electro-optical effect, which is based on the birefringence of the FLC material or on the dielectric anisotropy of an incorporated dichroic dye, becomes visible between crossed polarizers (polarizing foils). The electrode separation is generally from 1 to 3 μm, preferably at least 1.5 μm, particularly preferably at least 1.8 μm.

The display is designed for transmitted light (transmissive) or for reflected light (reflexive).

The FLC display for the chip card according to the invention can thus be produced following processes generally known in principle, as described, for example, in E. Lüder et al., 1997 International Symposium, Seminar & Exhibition, Society of Information Display, Boston, Mass., Abstract 9.4, SID 97 DIGEST, pp. 109–112.

In order to produce a chip card, the FLC display is embedded in or applied to a plastic card provided with one or more electronic microchips.

The microchips contain the program and/or storage functions that ensure the desired function of the chip card. Such chips and their production are known to the person skilled in the art.

The card generally consists of plastic, preferably of polyvinyl chloride (PVC), acrylonitrile-butadiene-styrene copolymers (ABS) or Biopol® (a biodegradable polymer based on renewable raw materials, Monsanto, USA).

It also contains means for electronic data exchange with an external write and/or read system, for example electroconductive contacts or an antenna in the form of flat coils.

The plastic cards used are known and the majority are commercially available (for example Gemplus, http://www.gemplus.fr).

Standard technical specifications for chip cards or smart cards according to the invention are given, for example, in:

ICC Card Specification for Payment Systems, Version 3 (1996), and the references cited therein, in particular:
  Europay, MasterCard, and Visa (EMV): Jun. 30, 1996 Integrated Circuit Card Application Specification for Payment Systems
  ISO/IEC 7813:1990 Identification cards—Financial transaction cards
  ISO 7816:1987 Identification cards—Integrated circuit(s) cards with contacts
    Part 1: Physical characteristics
  ISO 7816-2:1988 Identification cards—Integrated circuit(s) cards with contacts
    Part 2: Dimensions and location of contacts
  ISO/IEC 7816-3:1989 Identification cards—Integrated circuit(s) cards with contacts
    Part 3: Electronic signals and transmission protocols
  ISO/IEC 7816-3:1992 Identification cards—Integrated circuit(s) cards with contacts
    Part 3, Amendment 1: Protocol type T=1, asynchronous half duplex block transmission protocol
  ISO/IEC 7816-3:1994 Identification cards—Integrated circuit(s) cards with contacts
    Part 3, Amendment 2: Protocol type selection (Draft International Standard)
  ISO/IEC 7816-4:1995 Identification cards—Integrated circuit(s) cards with contacts
    Part 4, Interindustry commands for interchange
  ISO/IEC 7816-5:1994 Identification cards—Integrated circuit(s) cards with contacts
    Part 5: Numbering system and registration procedure for application identifiers
  ISO/IEC 7816-6:1995 Identification cards—Integrated circuit(s) cards with contacts
    Part 6: Interindustry data elements (Draft International Standard).

The chip card according to the invention is suitable, for example, as a check card, electronic travel card, telephone card, car park card, "electronic wallet" or for pay TV.

References cited in this application are expressly incorporated herein.

The invention is explained in greater detail by the examples, without this being intended to represent a limitation.

EXAMPLE 1

Mixture Example

An FCL mixture of the following composition

| Component | Proportion by weight [%] |
|---|---|
| $H_9C_4Si(CH_3)_2(CH_2)_6O$—[2-fluoropyridine-phenyl-cyclohexyl]—$C_5H_{11}$ | 22.95 |
| $H_9C_4Si(CH_3)_2(CH_2)_4O$—[phenyl-pyrimidine]—$OC_{10}H_{21}$ | 10.2 |
| $H_9C_4Si(CH_3)_2(CH_2)_6O$—[biphenyl]—$OC_8H_{17}$ | 6.38 |
| $H_{11}C_5$—[cyclohexyl-C(O)O-phenyl-O-C(O)-cyclohexyl]—$C_5H_{11}$ | 6.38 |

-continued
| Component | Proportion by weight [%] |
|---|---|
| 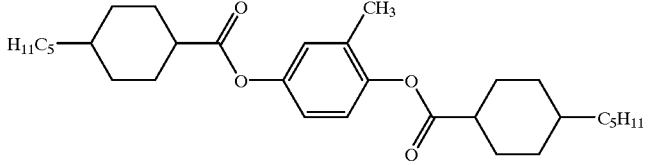 | 15.3% |
| 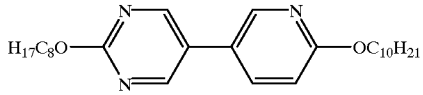 | 7.92 |
| 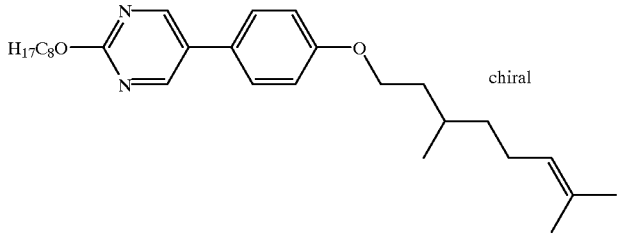 | 4.95 |
| 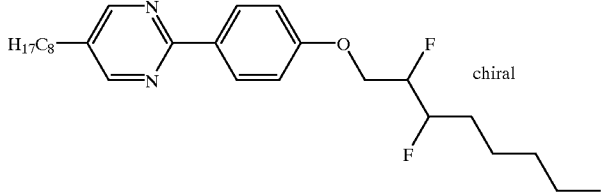 | 7.2 |
| 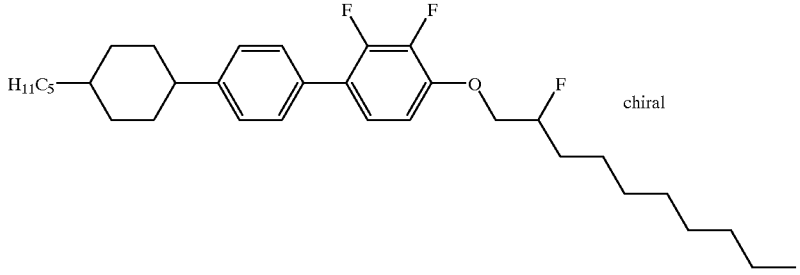 | 8.1 |
| 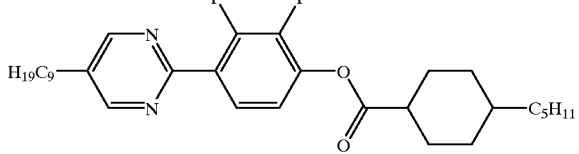 | 10.0 |
| 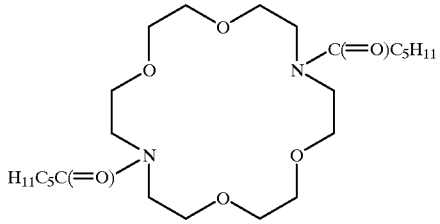 | 0.63 |

X −5 $S_C$ 60 $S_A$ 77 N 89 I. It has an optical anisotropy value Δn (Abbe refractometer) of 0.121 (at 30° C.). The spontaneous polarization is 27 nC/cm² at 25° C.

EXAMPLE 2

Display and Card

A flexible plastic film (obtainable, for example, from Sumitomo Bakelite, product code FST 5352, thickness 100 μm, 200 Ω/coated with indium-tin oxide) is structured in a photolithographic process to give an electrode pattern. The transparent conductor tracks of this electrode structure are used for electrical addressing of the display.

Two films structured in this way forming the top and bottom of the display—i.e. the outer plates—and having been provided with an alignment layer in an additional process step are joined with the aid of an adhesive frame and filled with the mixture from Example 1 with addition of a concentration of 0.5% by weight of spacer glass beads having a diameter of 2 μm. The adhesive is hardened by careful warming, the cell is sealed, the liquid-crystal mixture is poured in at 100° C., aligned by slow cooling to the operating temperature, and the cell is installed in a smart card between a pair of polarizing films. The switching-cell electrode contacts, which are routed to the outside, are connected to the corresponding contacts or flat coils of the smart card. When a voltage of 10 V is applied, this cell can be operated at 25° C.

What is claimed is:

1. A chip card containing a ferroelectric liquid-crystal display containing a ferroelectric liquid-crystal layer, wherein the liquid-crystal layer has optical anisotropy values of ≦0.15 in the region of between −10 and 40° C., wherein the liquid-crystal layer comprises one or more compounds of the formula (I)

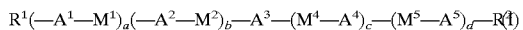

where the symbols and indices are defined as follows:
$R^1$ is
  a) hydrogen, —F, —Cl, —CF₃, —OCF₃ or —CN,
  b) a straight-chain or branched alkyl radical (with or without an asymmetrical carbon atom) having 1 to 20 carbon atoms, where
    b1) one or more non-adjacent and non-terminal —CH₂— groups may be replaced by —O—, —S—, —CO—, —CO—O, —O—CO, —O—CO—O—or —Si(CH₃)₂—, and/or
    2) one or more —CH₂— groups may be replaced by —CH=CH—, —C≡C—, cyclopropane-1,2-diyl, 1,4-phenylene, 1,4-cyclohexylene or 1,3-cyclopentylene, and/or
    3) one or more H atoms may be replaced by F, CN and/or Cl, and/or
    4) the terminal CH₃ group may be replaced by one of the following chiral groups (optically active or racemic):

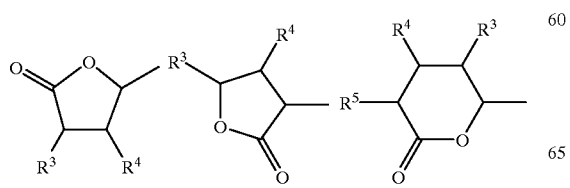

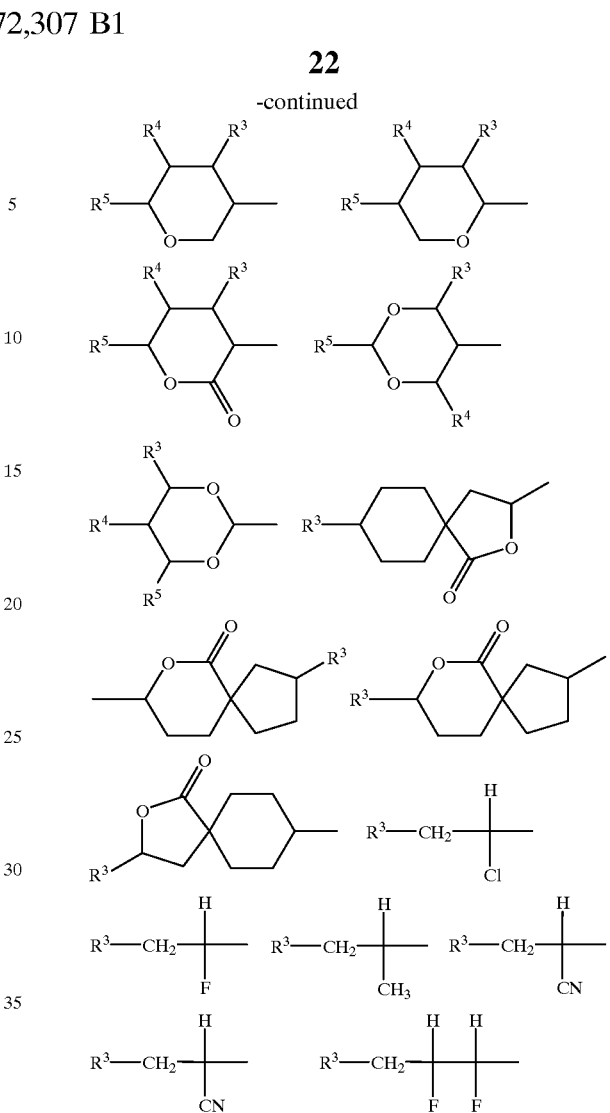

$R^3$, $R^4$, $R^5$, $R^6$ and $R^7$ are identical or different and are
  a) hydrogen
  b) a straight-chain or branched alkyl radical (with or without an asymmetrical carbon atom) having 1 to 16 carbon atoms, where
    b1) one or more non-adjacent and non-terminal —CH₂— groups may be replaced by —O—, and/or
    2) one or two —CH₂— groups may be replaced by —CH=CH—,
  c) $R^4$ and $R^5$ together may alternatively be —(CH₂)₄— or —(CH₂)₅— if they are bonded to an oxirane, dioxolane, tetrahydrofuran, tetrahydropyran, butyrolactone or valerolactone system;
$R_2$ is a straight-chain or branched alkyl radical (with or without an asymmetrical carbon atom) having 1 to 20 carbon atoms, where
  a) one or more non-adjacent and non-tenninal —CH₂— groups may be replaced by —O—, —S—, —CO—, —CO—O, —O—CO—, —O—CO—O—or —Si(CH₃)₂—, and/or
  b) one or more —CH₂— groups may be replaced by —CH=CH—, —C≡C—, cyclopropane-1,2-diyl, 1,4-phenylene, 1,4-cyclohexylene or 1,3-cyclopentylene;
$M^1$, $M^2$, $M^4$ and $M^5$ are identical or different and are a single bond or —CO—O—, —CO—S—, —CS—O—, —CS—S—, —CH$_2$—O—, —CH$_2$—S—, —CH$_2$—CH$_2$—, —CH=CH—, —C≡C—, —CH$_2$—CH$_2$—CO—O—, —CH$_2$CH$_2$CH$_2$O—, —CH$_2$CH$_2$CH$_2$CH$_2$—, (E)—CH=CHCH$_2$O—, and their mirror-image arrangements; or a single bond, A$^1$ and A$^5$ are identical or different and are cyclohexane-1,4-diyl, 1-cyanocyclohexane-1,4-diyl, 1,3-dioxane-2,5-diyl, 5-cyano-1,3-dioxane-2,5-diyl, 1,3-dioxaborinane-2,5-diyl or 1-alkyl-1-silacyclohexane-1,4-diyl;

A$^2$ and A$^4$ are identical or different and are cyclohexane-1,4-diyl, 1-cyanocyclohexane-1,4-diyl, 1,3-dioxane-2,5-diyl, 5-cyano-1,3-dioxane-2,5-diyl, 1,3-dioxaborinane-2,5-diyl, 1-alkyl-1-silacyclohexane-1,4-diyl, 1,4-phenylene, 2-fluoro-1,4-phenylene, 2,3-difluoro-1,4-phenylene, pyrimidine-2,5-diyl, pyridine-2,5-diyl or 2-fluoropyridine-3,6-diyl;

A$^3$ is 1,4-phenylene, in which one or more H atoms may be replaced by F, Cl, CH$_3$, C$_2$H$_5$, OCH$_3$, CF$_3$, OCF$_3$ and/or CN, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,3,4-thiadiazole-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4diyl, in which one H atom may be replaced by F, Cl and/or CN, thiophene-2,5diyl, in wich one or two H atoms may be replaced by F, Cl and/or CN, naphthalene-2,6-diyl, naphthalene-1,4-diyl or naphthalene-1,5-diyl, in each of which one or more H atoms may be replaced by F, Cl and/or CN and/or one or two CH groups may replaced by N;

a, b, c and d are zero or one and the sum a+d is 1 or 2, with the proviso that the compound of the formula (I) cannot contain more than four five-or higher-membered ring systems.

2. A chip card as claimed in claim 1, in the form of a smart card.

3. A chip card as claimed in claim 1, wherein the ferroelectric liquid-crystal display is designed for transmitted light.

4. A chip card as claimed in claim 1, wherein the ferroelectric liquid-crystal display is designed for reflected light.

5. A chip card as claimed in claim 1, wherein the optical anisotropy is in the range from 0.05 to 0.15.

6. A chip card as claimed in claim 1, wherein the liquid-crystal layer comprises from 20 to 85% by weight of one or more compounds of the formula (I).

7. A process for the production of a chip card as claimed in claim 1, in which a ferroelectric liquid-crystal display containing a ferroelectric liquid-crystal layer having an optical anisotropy of ≦0.15 in the operating temperature range of the display is embedded in or applied to a plastic card, where the plastic card is provided with an integrated circuit which is able to store information electronically, and means for information transmission between the card and an electronic read and/or write system.

* * * * *